(12) United States Patent
Liu

(10) Patent No.: US 6,354,523 B1
(45) Date of Patent: Mar. 12, 2002

(54) METHOD AND APPARATUS FOR RECYCLING RUBBER

(76) Inventor: Yangsheng Liu, Nanjing Weilong Industrial Co. Ltd. Jiangsu Ton Xin, Plaza. No 198, JiQing Road, Nanjing 21006, Jiangsu Province. P.R. (CN)

(*) Notice: Subject to any disclaimer, the term of this patent is extended or adjusted under 35 U.S.C. 154(b) by 0 days.

(21) Appl. No.: 09/542,177

(22) Filed: Apr. 4, 2000

(51) Int. Cl.[7] .......................... B02C 11/08; B02C 19/12
(52) U.S. Cl. ............................. 241/23; 241/19; 241/21; 209/172.5; 525/237
(58) Field of Search ................ 241/7, 12, 13, 241/17, 23, 24, 24.1; 209/172, 172.5, 173; 529/236, 237

(56) References Cited

U.S. PATENT DOCUMENTS

| | | | |
|---|---|---|---|
| 3,966,672 A | * 6/1976 | Gaylord | 241/23 |
| 5,083,712 A | * 1/1992 | Askew et al. | 241/21 |
| 5,695,130 A | * 12/1997 | Csendes | 241/19 |
| 5,854,311 A | * 12/1998 | Richart | 241/16 |
| 6,126,096 A | * 10/2000 | Robinson et al. | 24/23 |
| 6,207,723 B1 | * 3/2001 | Matsushita et al. | 525/237 X |

FOREIGN PATENT DOCUMENTS

CN 1127693 7/1996

* cited by examiner

*Primary Examiner*—W. Donald Bray
(74) *Attorney, Agent, or Firm*—Coudert Brothers LLP

(57) ABSTRACT

An apparatus and method for forming superfine particles of rubber powder suitable for recycling, as by incorporation into new rubber production, is shown. Coarsely ground rubber particles, formed in a conventional manner, are mixed in a soaking vessel with a reagent which causes the rubber particles to swell. The swollen, reagent-impregnated rubber is less elastic and more easily ground. The reagent-impregnated particles are then transported to a grinder which reduces the size of the particles to 200 μm or less. The ground particles are then heated to drive off the reagent which is recovered in a reagent recovery system. The dried particles are then sorted according to size. The process is conveniently automated and provides the ability to economically recycle rubber.

44 Claims, 3 Drawing Sheets

US 6,354,523 B1

METHOD AND APPARATUS FOR RECYCLING RUBBER

FIELD OF THE INVENTION

The present invention relates to recycling of vulcanized rubber and is particularly related to a method and apparatus for forming a superfine powder from spent rubber products and waste from rubber production.

BACKGROUND OF THE INVENTION

It is estimated that 15,000,000 tons or more of vulcanized rubber products are discarded throughout the world annually. Approximately half this amount is in the form of rubber tires—upwards of 700 million tires are discarded per year worldwide. It is estimated that there are as many as three billion waste tires in the U.S. alone. In addition, a substantial amount of waste rubber is associated with the production of new rubber products. The handling and disposal of this large volume of waste rubber is a significant environmental problem, and the desirability of recycling waste rubber is evident. The improper or unregulated disposal of rubber tires is also known to create fire and health hazards. Unfortunately, the very properties which make vulcanized rubber so useful make it extremely difficult to recycle. Specifically, vulcanized rubber does not melt, age or decompose and is formulated to be used in extreme environmental conditions. Rubber used in tires is highly elastic and tenacious in a temperature range of −50°−+150° C., and is highly resistant to attack by most common chemical substances. While significant research has been devoted to investigating techniques for recycling rubber, to date only a small percentage of waste rubber is recycled.

One avenue of investigation has been directed to forming rubber powders from waste rubber by grinding the rubber. The rubber powders are then used in various ways, for example rubber powder may be added to a raw rubber mix to form new rubber. This technique has important potential cost savings because the rubber powder reduces the energy and processing required to make new rubber. Currently, rubber powder is used in making many rubber products, including tires, hoses, rubber bands, etc. In addition, rubber powders can be added to other products, such as building materials, to improve their properties.

The amount of rubber powder that can be added to a raw rubber mix during rubber production is highly dependant on the size and shape of the rubber particles which comprise the powder. Specifically, it is known that superfine rubber particles (particles having a diameter of about 200 $\mu$m or less) may be added in significantly higher percentages than larger particles. However, traditional grinding techniques produce rubber particles having a diameter in excess of 600 $\mu$m. To date, addition of rubber powder having particles in excess of 600 $\mu$m has not been accepted by producers of rubber products, because rubber made with large particles has poor properties. Rubber powder consisting of particles in the range of 200–400 $\mu$m may be added in an amount of up to 10% without adversely affecting the quality of the rubber produced.

Finer grain rubber particles may be produced by grinding the rubber at extremely low (cryogenic) temperatures (for example, using liquid nitrogen) such that the rubber loses its elasticity and grinds more easily. However, due to the energy required to cool the rubber to a sufficiently low temperature, it is uneconomically expensive to form rubber powder in this way.

In Chinese Patent CN 1127693 the inventor of the present invention has previously disclosed a technique for grinding rubber which employs a reagent to cause the rubber to swell. The swollen rubber is less elastic and, therefore, more easily ground into fine particles. The prior disclosure teaches soaking coarsely ground rubber in a non-polar reagent for 5–30 seconds, and then performing further grinding of the resulting swollen powder to achieve a superfine rubber powder. The prior disclosure further teaches that such a rubber powder can be mixed with raw rubber in excess of 40% without impairing the physical properties of the rubber. The prior disclosure suggests the use of toluene, xylene, carbon tetrachloride, carbon trichloride, acetone, ethyl alcohol or mixtures thereof as reagents to cause the rubber to swell.

At the time of the inventor's prior disclosure, the system for economically creating a superfine powder from waste rubber had not been perfected. Since that time the inventor has developed various improvements and additions to his system, as described herein, which greatly improves the efficiency and usefulness of the system.

Accordingly, one object of the present invention is to provide an optimized system for efficiently creating superfine rubber powder suitable for recycling.

Another object of the present invention is to provide a system for creating a superfine rubber powder with characteristics which allow it to be easily incorporated into new rubber production.

Another object of the present invention is to provide a system for creating superfine rubber powder using a swelling reagent, which provides for highly efficient recycling of the swelling reagent.

SUMMARY OF THE INVENTION

The foregoing objects of the invention, and others which will be apparent to those skilled in the art, are realized in the present method and apparatus for making superfine rubber powder from coarsely ground rubber. In one of its broad aspects, the present invention comprises system for forming superfine rubber powder having a soaking container for holding a mixture of coarsely ground rubber particles and a reagent which causes the rubber particles to swell, a grinder for grinding the swollen particles of coarsely ground rubber into superfine particles of rubber, a reagent recovery system comprising a heater and suction equipment for removing the reagent from the superfine particles of rubber to form a dry rubber powder and for recovering the reagent for reuse, and a sorter for classifying the particles of dry rubber according to size. Preferably, the reagent recovery system also collects reagent vapors from the soaking container and from the grinder. The grinder is preferably a slope-faced mill which applies both a substantial grinding force and a substantial shearing force to the coarse rubber particles being ground. The grinder preferably has a stationary face and a rotating face, and at least one of the faces has a plurality of spiral grooves having knife-edges. In one embodiment, the grinder is made of metal and has cooling system to maintain it at a suitable temperature. The separation distance between the faces is, preferably, adjustable. If still finer rubber particles are desired, a second grinder may be used to further grind the reagent-impregnated rubber particles after they are processed by the first grinder. In an automated system, the rubber particles travel from the soaking container to the grinder using a first screw feed or other suitable automated transport mechanism, and from the grinder to the sorter using a second screw feed or transport mechanism. The second screw feed is maintained at an elevated temperature to drive the reagent out of the rubber. The solvent recovery system preferably encloses the entire system, from the container to the second screw feed, and maintains the system at a slight vacuum, so that the reagent is recovered and can, thereafter, be reused.

The present invention also comprises a method of producing superfine rubber powder, comprising the steps of soaking a mixture of a reagent and particles of coarsely ground rubber powder such that the particles become impregnated with the reagent and swell; grinding the reagent-impregnated swollen rubber particles to form superfine rubber particles; heating the superfine rubber particles in an enclosed environment and applying a vacuum pressure to the enclosed environment, such that the reagent vapors are driven from the rubber particles, and collecting and condensing the reagent vapors. A crystalloid salt, preferably one that is compatible with the rubber-making process, such as zinc carbonate, may be added to the swollen rubber particles prior to the grinding step.

DETAILED DESCRIPTION

The present invention comprises a system for forming superfine rubber powder that is suitable for recycling. In the system of the present invention, a reagent is mixed with coarsely ground rubber particles in order to cause the rubber particles to swell. The swollen rubber particles are substantially less elastic than unswollen rubber and can be efficiently ground into a superfine powder which is suitable for recycling, as by incorporating the superfine powder into new rubber being produced. As used herein, superfine rubber powder refers to rubber powder wherein the average particle size is below about 200 $\mu$m or less in diameter when unswollen.

Figure 1:
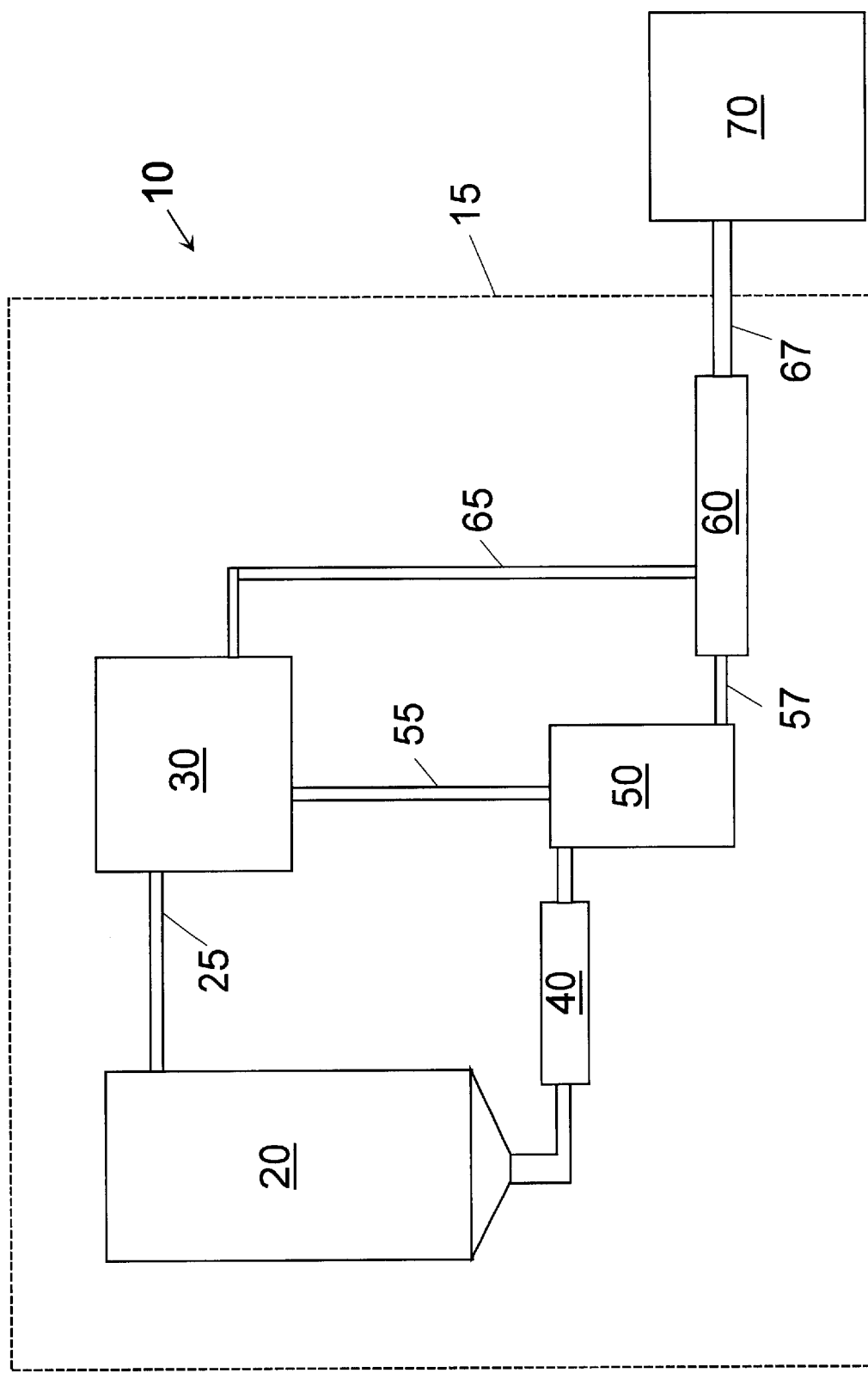
FIG. 1 is a schematic diagram of the system of the present invention for making superfine rubber powder.

Referring to FIG. 1, a schematic diagram of the overall system of the present invention is shown. The present invention starts with coarsely ground rubber particles, i.e., particles having a mean diameter in the range of about 500 $\mu$m to 1,500 $\mu$m. Methods of grinding rubber to form rubber particles in this size range are well known in the art and need not be described in detail. For example, a conventional high speed shearing roller crusher may be used. While practical considerations make it desirable to start with particles in the range stated, there is no reason why the starting particles cannot fall outside of this range. Extraneous materials which may be in the starting rubber, such as fibers and metal wires used in tires, are removed from the coarsely ground rubber using conventional techniques known in the art.

The coarsely ground particles are placed into a soaking vessel or container 20 which is, preferably, part of an enclosed system 10 which is configured to automate the entire process. As described in greater detail below, the system is enclosed to facilitate reagent recovery. While not shown, the process of feeding the coarsely ground rubber to container 20 may also be automated. In one embodiment, soaking container 20 is made of stainless steel and contains an integral stirring mechanism.

A swelling reagent is then mixed with the coarsely ground rubber particles in the soaking vessel 20. The swelling reagents that have been found to be effective are various organic solvents, particularly hydrocarbons, ketones and lactones. Specifically, benzene, cyclohexanone, cyclohexane, toluene, xylene, hexane, heptane, acetone, methyl ethyl ketone, gasoline, paramethadione, ethyl acetate and amyl acetate have been found to be effective. The reagent that is selected should be a compound which causes the rubber particles to swell, but which does not attack or react chemically with the rubber. Particularly preferred reagents are benzene, cyclohexanone, cyclohexane. The optimal reagent or reagent mixture used will depends on the type of rubber(s) being recycled, and should have the same polarity as the rubber.

In order to facilitate recycling of the reagent, it is preferred that a single reagent compound be used. However, it may be desirable to use a mixture of reagent compounds in certain circumstances, for example, when certain mixtures of rubbers are to be recycled. When reagents are mixed, it is preferred that each reagent compound in the mixture have the same polarity.

The coarse rubber particles are soaked in the swelling reagent(s) for a sufficiently long time to cause the particles to increase in size by at least about 100%. The exact amount of time required to do this will vary according to the size of the particles, the type(s) of rubber, and the nature of the reagents. However, normally the particles should be allowed to soak for at least about five minutes. The mixture of rubber particles and reagent may be stirred during this time to ensure that all of the rubber particles come in full contact with the reagent, thereby accelerating the reagent impregnation process. Preferably, at least twice the volume of the reagent is used as rubber, i.e., at least two parts of reagent are used for one part of coarsely ground rubber particles. According to the preferred embodiment of the present invention, substantially all of the reagent should be absorbed during the soaking process. In order to maximize the swelling of the rubber particles, the amount of reagent is preferably at least about 2.5 times the amount of rubber particles, by weight. On the other hand, in order to ensure that all of the reagent is absorbed, i.e., that there is no excess reagent residue after the soaking process, the amount of reagent should be kept to less than about 3.5 times the amount of rubber, by weight. Thus, according to the preferred embodiment, the weight ratio of reagent to rubber should be within the range of about 2.5–3.5 to 1 in order to cause the rubber to become fully swollen without excess liquid. While the foregoing ratio is preferred, it does not depart from the basic invention to use excess reagent and filter or otherwise remove the excess from the swollen rubber particles during the course of subsequent processing.

The selection and handling of the reagents used in connection with the present invention should take in account health and safety considerations. Whenever possible, preference should given to reagents with the least toxicity, lowest flammability and best handling characteristics.

As noted, the coarsely ground rubber is soaked in a container 20 which is part of an enclosed system 10. Any reagent vapors emanating from container 20 are captured for recovery and recycling using solvent recovery system 30 which is coupled to container 20 via conduit 25. Preferably, vacuum equipment or other suction apparatus is used to draw vapors away from various system components into solvent recovery system 30. While a vacuum pump is preferred, other equipment to create a vacuum may be used. For example, a slight vacuum pressure may be created by using an absorption reagent or by condensation.

Reagent recovery system 30 comprises three main components, a heat exchanger to condense the reagent vapors, an absorption tower and a vacuum pump. In one embodiment, the main components of the reagent recovery system are fabricated from stainless steel, and a water-jet vacuum pump is used. In one embodiment, the system is pumped at a rate of 10–12 m³/min. and pressure is maintained at a level of 20 Kpa.

While a condenser is able to recover much of the reagent, full recovery requires the further use of an absorption tower. The absorption tower of the present invention is an enclosed vessel packed with a porous medium which has an affinity for the reagent(s) used in the process. The porous medium of the packing comprises very fine particles presenting a very large overall surface area to the reagent vapors circulated through the vessel. The affinity of the reagent for the porous medium in the vessel allows nearly complete capture of the reagent vapors, and creates a suction in the system as the vapors are absorbed. When the porous medium has absorbed a substantial amount of the reagent vapors, the reagent can be removed and recovered as by circulating water vapor through the material.

The purpose of soaking the rubber particles is to facilitate further processing, i.e., grinding of the swollen particles to create a superfine rubber powder. According to the present invention, further processing of the particles occurs within the enclosed system so as to prevent the escape of reagent vapors, and thereby permit the recovery and recycling of the reagents. The enclosure of the overall system is depicted schematically by broken line 15.

After the soaking the coarsely ground particles of rubber so that they are impregnated with reagent, the swollen particles are transported via grinder screw feed 40 to grinder 50. Conduit 55 couples grinder 50 with solvent recovery system 30, so that any reagent vapors from the grinder are captured by the solvent recovery system 30.

Figure 2:
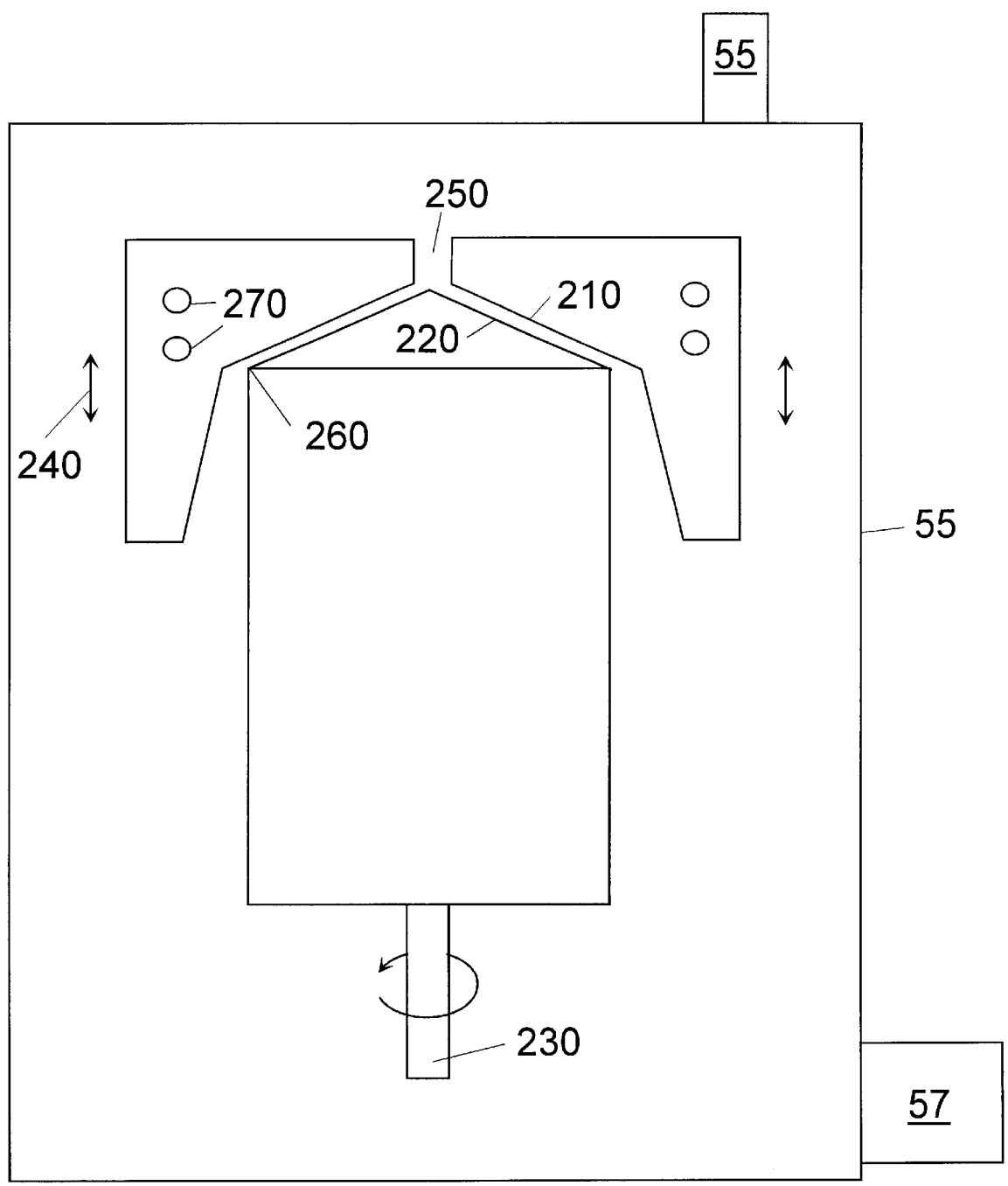
FIG. 2 is a schematic, cross-sectional diagram of the grinder of the present invention.

A preferred embodiment of grinder 50 is shown schematically in FIG. 2. Grinder 50 will be referred to herein as a sloped-faced mill. The mill inside of grinder 50 comprises a stationary face 210 in opposing relationship to a rotating face 220. Both faces are at a slight angle to the axis of rotation 230. The separation distance between faces 210 and 220 is adjustable as depicted by arrows 240. While arrows 240 suggest that the separation distance between faces 210 and 220 is adjusted by moving stationary face 210, moving face 220 may be adjusted vertically instead, or both faces may be independently adjustable.

An aperture 250 is used to feed the reagent-impregnated, swollen rubber particles into the space between the faces of the mill where it is ground into superfine rubber particles. The slope-faced mill depicted in FIG. 2 is particularly advantageous for practicing the present invention because it applies both a shearing force and a grinding force to the rubber particles as they travel from aperture 250 to the outer periphery 260 of the mill faces. This combination of forces is particularly effective in forming superfine rubber powder, and creates particles having a shape which allows them to be more easily incorporated into new rubber.

Figure 3:
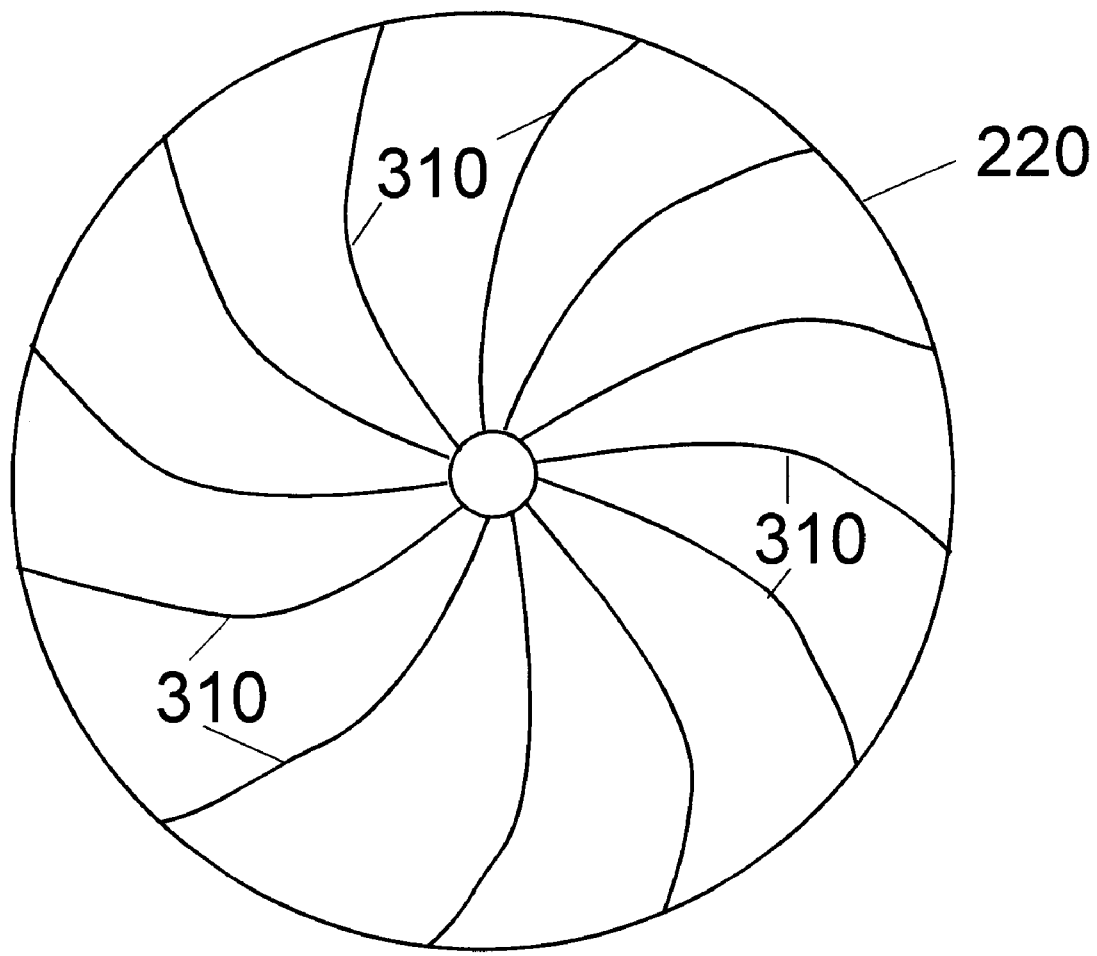
FIG. 3 is a schematic diagram of the rotating face of the grinder of the present invention.

Preferably, faces 210 and 220 of the mill are made of a metal alloy, such as alloy steel, which is highly wear resistant, which does not produce contaminate particles, and which does not react with the reagent(s) used in the system. In addition, as depicted in FIG. 3, it is preferred that the rotating face 220 of the mill have a plurality of generally spiral grooves 310, which extend from a position adjacent aperture 250 to the peripheral edge 260 of rotating face 220. In the preferred embodiment, grooves 310 have knife-edges to assist in the grinding of the coarsely ground rubber. Other shapes and lengths of grooves may also be employed.

While FIG. 3 schematically shows grooves 310 formed in rotating face 220, grooves may be formed in stationary face 210 instead of, or in addition to, the grooves in rotating face 220. In addition to assisting the grinding process, grooves 310 help move the particles from aperture 250 to peripheral edge 260. Upon reaching the peripheral edge the ground particles move under the influence of gravity away from the mill and are transported out of grinder 50 through conduit 57. At this point the superfine rubber particles remain impregnated with reagent and are substantially larger than their final size.

Preferably, grinder 50 is cooled, or otherwise maintained a desired temperature so as to avoid overheating, etc. As depicted schematically in FIG. 2, stationary portion of the mill may contain one or more cooling channels 270 for circulating a temperature exchange fluid, such as water.

While a slope-faced mill is described, other types of grinders may be used in connection with the system of the present invention. Preferably, the grinder will have the following functional attributes: (1) it should produce particles that are irregularly shaped and similarly sized, (2) it should be easily automated, (3) it should require minimal maintenance, (4) it should have high efficiency, e.g., minimal energy consumption, and (5) it should be compatible with the rubbers and reagents processed in the system.

After the rubber particles have been ground to a superfine powder in grinder 50, the processed rubber is heated causing the absorbed reagent to evaporate. Again, heating of the processed rubber is performed within enclosed system 15 so that the reagent can be recovered in solvent recovery system 30 and recycled. A slight vacuum is applied to the system to facilitate the recovery process.

In the preferred embodiment, the superfine rubber particles are heated in a specially adapted screw feed 60, as shown in FIG. 1, which transports the ground rubber from the grinder 50 to a sorter 70 where the rubber particles are classified according to size. Preferably, screw feed 60 has a trough jacket for temperature control and is constructed of stainless steel. While a screw feed is described, other transport mechanisms may be employed to convey the ground rubber away from grinder 50. In one embodiment, sorter screw feed 60 is the primary site for heating the powder to drive the reagent from the rubber particles. This process is facilitated by maintaining the sorter screw feed at an elevated temperature, thereby causing the reagent to enter the vapor phase so that it may be collected by solvent recovery system 30, which is coupled to screw feed 60 via conduit 65. Preferably, the screw feed is maintained at a temperature of at least about 80° C. –90° C. while in operation. Hot air, hot oil or steam may be circulated through the jacket to heat the screw feed. In order to assure that the reagent is fully evaporated, the ground rubber preferably remains resident in screw feed 60 for at least about twenty minutes. The optimal residence time and the optimal temperature will depend on the specific reagent employed, the amount of reagent that is absorbed by the particles, and the size and shape of the particles. It will be appreciated that a separate heating chamber or container may be used to recover the reagent, rather that screw feed 60.

As described thus far, the present invention is capable of producing superfine rubber powder, i.e., rubber powder having particles below about 200 μm in diameter. The particles that are produced have a highly irregular shape. It is believed that the irregularity of the shape gives rise to a large number of molecular fragments which, when mixed with raw (unvulcanized) rubber during the production of new vulcanized rubber, improves the plasticity, adherence and surface smoothness of the resulting vulcanized rubber. In other words, smaller, irregular particles improve the physical/mechanical properties of new rubber made from a mixture of raw rubber and the rubber powder of the present invention. This allows the rubber powders of the present invention to be incorporated into new rubber production in amounts approaching fifty percent. It is estimated that the rubber powders of the present invention may save up to eighty percent of the energy required to make an equal amount of synthetic rubber. There are significant additional benefits, most notably, the reuse of waste rubber that is difficult and expensive to dispose of.

In contrast to the present invention, the other known method of producing superfine rubber powders—grinding at cryogenic temperatures—produces particles which have a smooth surfaces and are, therefore, less useful than the irregularly-shaped particles of the present invention.

According to another aspect of the present invention, if even finer powder is desired, e.g., powders having a diameter of about 100 $\mu$m or less, an "assistant agent," namely a crystalloid salt, may be added to the coarsely ground rubber prior to the grinding step. Conveniently, the crystalloid salt may be zinc carbonate, which is commonly used in the rubber industry as an activating agent, and is, thus, compatible with incorporation of the powdered rubber into new rubber production. The amount of the assistant agent added to the swollen rubber particles is preferably kept to about five percent or less, by weight, ol the dry rubber powder (i.e., the weight of the rubber prior to mixing with reagent). While the use of more of the assistant reagent may further enhance grinding, use of amounts in excess of 5% are not believed to be cost effective and may have other adverse effects. In addition, a two-step grinding procedure, with or without the use of an assistant agent, may be employed to further reduce the size of the particles comprising the rubber powder.

After the superfine rubber powder of the present invention has been formed and dried, it is delivered to sorter 70 via conduit 67 coupled to sorter screw feed 60. As depicted in FIG. 1, sorter 70 may be located outside of enclosed system 15 because substantially all of the reagent has been removed from the powder prior to delivery to the sorter. Sorter 70 may comprise any of a number of known devices for sorting or grading particles of material according to size. For example, sorter 70 may comprise a vibrating grate or a cyclone separator. Preferably, particles that are larger than desired are returned to soaking container 20 and processed over again.

While it is preferred that the particles be sorted after they are dried, it is possible, without departing from the spirit of the present invention, to perform sorting prior to drying. In that case the sorter should also be within enclosed system 15 and coupled to reagent recovery system 30.

The solvent recovery system 30 comprises a vacuum pump or other suction device to collect vapors from various elements of the larger system. Preferably, the vacuum pressure of the system is maintained at about 730 mm of Hg or less. While this is only a slight vacuum, it is sufficient to collect reagent vapors. In addition, solvent recovery system 30 comprises a condenser to cause the collected vapors to condense back into the liquid phase. It is preferred that all of the materials used in the construction of the system 10 be compatible with the reagent, such that when the reagent is condensed it may be immediately reused without the need for any purification or decontamination. The vacuum pump and condenser are standard elements that need not be described in greater detail. The solvent recovery system of the present invention results in recapture of up to 99% or more of the reagent. It should be noted that in a broad sense, the heater used to drive the reagent from the superfine rubber powder is a part of the solvent recovery system, even though it is outside of block 30 of FIG. 1.

EXAMPLE 1

Coarsely crushed rubber having grains averaging 1.5 mm, consisting of a mixture of 70% natural rubber and 30% 3-polybutadiene rubber, was fed into a soaking vessel containing cyclohexane. The volume of cyclohexane was two times the volume of the rubber. The resulting mixture was stirred at a rate of 25 rotations per minute for five minutes, after which the size of the rubber particles had increased by 100%. The swollen rubber grains were fed to a grinder using a screw conveyor. After grinding the rubber particles were dried in a second screw feed to evaporate and recover the reagent. The temperature of the screw feed was maintained in the range of 80° C.–85° C., and the rubber particles remained in the drier/feed for thirty minutes. As the reagent was evaporated, the rubber particles shrank in size. Substantially all of the resulting rubber powder was able to pass through a mesh screen having opening of 180 $\mu$m. Thirty percent (30%) of the powder was fine enough to pass through a screen having openings of 150 $\mu$m and twenty percent (20%) of the powder was fine enough to pass through a screen with openings of 125 $\mu$m. The resulting powder contained less than 1 part per million (ppm) of the reagent, cyclohexane.

EXAMPLE 2

Coarsely ground rubber grains having an average diameter of 0.9 mm, consisting of a mixture of 45% natural rubber, 20% butyl rubber, 20% ethylene propylene rubber and 15% styrene-butadiene rubber, was fed into a soaking vessel containing a reagent mixture consisting of 80% cyclohexane and 20% methyl ethyl ketone. The volume of the reagent mixture was 2.5 times the volume of the rubber. The mixture was stirred for five minutes after which the size of the rubber particles increased by 100%. After the rubber particles became swollen, five percent (5%) by weight of zinc carbonate was added to the swollen rubber particles to improve grinding, and the mixture conveyed to a grinder using, a screw feed. Zinc carbonate is used in new rubber production in the vulcanization process and, therefore, need not be removed from the superfine rubber powder of the present invention prior to incorporation in new rubber. The solvent in the ground rubber was removed by drying, and the size of the particles was reduced. The rubber was dried in a second screw feed which was maintained at a temperature in the range of 85° C. –90° C. The ground rubber was in the drier for about 20 minutes. Substantially all of the resulting powder passed through a 180 $\mu$m mesh screen, 80% of the powder passed through a 150 $\mu$m mesh screen, 50% passed through a 125 $\mu$m mesh screen, and 20% passed through a 75 $\mu$m screen. The reagent recovery was in excess of 99%; the processed superfine rubber powder contained less than 0.04 ppm of cyclohexane and 0.06 ppm of methyl ethyl ketone.

While the present invention has been described in connection with preferred embodiments thereof, those skilled in the art will appreciate that further additions and modifications may be made without departing from the spirit thereof. Therefore, the invention is limited only by the appended claims.

What is claimed is:

1. A system for forming superfine rubber powder comprising:
   a soaking container for holding a mixture of coarsely ground rubber particles and a reagent which causes said rubber particles to swell,
   a grinder for grinding said swollen particles of coarsely ground rubber into superfine particles of rubber,
   a heater for driving the reagent from the superfine particles of rubber,
   a reagent recovery system comprising a suction device and a condenser for removing said reagent from said superfine particles of rubber to form a dry rubber powder and for recovering the reagent for reuse,
   a sorter for classifying the particles of dry rubber according to size.

2. The system of claim 1 wherein said reagent recovery system collects reagent vapors from said grinder.

3. The system of claim 2 wherein said reagent recovery system collects reagent vapor from said soaking container.

4. The system of claim 1 wherein said grinder applies both a substantial shearing force and a substantial grinding force to said rubber particles.

5. The system of claim 4 wherein said grinder is a slope-faced mill comprising a stationary face and a rotating face.

6. The system of claim 5 wherein at least one face of said mill has a plurality of grooves.

7. The system of claim 6 wherein at least some of said grooves have a generally spiral shape and comprise knife edges.

8. The system of claim 5 wherein said stationary face and said rotating faces are made from a metal.

9. The system of claim 8 wherein said stationary face in mounted on a metal jacket which surrounds said rotating face, and wherein said metal jacket comprises cooling means for controlling the temperature of said grinder.

10. The system of claim 5 wherein the separation distance between said faces is adjustable.

11. The system of claim 1 comprising first and second grinders, said first grinder for pulverizing said coarse rubber powder and said second grinder for further reducing the particle size of reagent-impregnated particles created by said first grinder.

12. The system of claim 1 wherein said suction device maintains the pressure in the system at about 730 mm of Hg or less.

13. The system of claim 1 further comprising a grinder screw feed coupled to said container and to said grinder for transporting said reagent-impregnated rubber particles from said soaking container to said grinder.

14. The system of claim 1 further comprising a sorter screw feed coupled to said grinder and to said sorter for transporting ground rubber particles from said grinder to said sorter.

15. The system of claim 14 wherein said reagent recovery system is coupled to said sorter screw feed.

16. The system of claim 15 wherein said sorter screw feed comprise said heater such that the contents of said sorter screw feed are maintained at an elevated temperature while traveling through said sorter screw feed.

17. The system of claim 16 wherein said sorter screw feed is maintained at a temperature of at least about 80° C. while said system is in operation.

18. The system of claim 1 wherein said sorter comprises a vibrating grate.

19. The system of claim 1 wherein said sorter comprises a cyclonic separator.

20. A method of producing superfine rubber powder, comprising the steps of:
   soaking a mixture of a reagent and particles of coarsely ground rubber powder such that said particles become impregnated with said reagent and swell;
   grinding said reagent-impregnated swollen rubber particles to form superfine rubber particles;
   heating said superfine rubber particles in an enclosed environment and applying suction to said enclosed environment, such that said reagent is removed from said superfine rubber particles,
   collecting and condensing said reagent vapors.

21. The method of claim 20 wherein said step of soaking said rubber coarsely ground rubber particles causes said particles to increase in size by at least about 100%.

22. The method of claim 20 wherein said step of soaking said coarsely ground rubber particles lasts at least about five minutes.

23. The method of claim 20 wherein said step of grinding comprises applying both a substantial grinding force and a substantial shearing force to said coarsely ground particles.

24. The method of claim 23 wherein said grinding step comprises the use of a slope-faced mill comprising a stationary face and a rotating face.

25. The method of claim 24 wherein said faces of said mill are made of metal.

26. The method of claim 25 further comprising the step of cooling said mill while said it is in operation.

27. The method of claim 23 wherein one of the faces of said mill has a plurality of grooves formed thereon.

28. The method of claim 27 wherein said grooves comprise knife edges.

29. The method of claim 20 wherein said reagent-impregnated coarsely ground rubber particles are conveyed away from said grinder using a screw feed.

30. The method of claim 29 further comprising the step of maintaining said screw feed at an elevated temperature during operation.

31. The method of claim 30 wherein said screw feed is maintained at a temperature of at least about 80° C.

32. The method of claim 29 further comprising the step of applying suction to said screw feed while it is in operation.

33. The method of claim 32 wherein said vacuum pressure is about 730 mm of Hg or less.

34. The method of claim 20 further comprising the step of grinding the superfine rubber particles while they remain impregnated with reagent such that the size of the particles is further reduced.

35. The method of claim 20 wherein said step of soaking said coarsely ground particles of rubber comprises mixing at least about two parts of reagent for one part of particles.

36. The method of claim 35 wherein the ratio of reagent to rubber is in the range of 2.5–3.5 to 1.

37. The method of claim 20 wherein substantially all of the reagent that is mixed with the rubber particles is absorbed.

38. The method of claim 20 further comprising the step of adding a crystalloid salt to said coarsely ground rubber prior to the step of grinding.

39. The method of claim 38 wherein said crystalloid salt is zinc carbonate.

40. The method of claim 38 wherein the amount of crystalloid salt that is added is about 5% or less by weight.

41. The method of claim 20 further comprising the step of sorting the particles of superfine rubber powder by size.

42. A method of forming superfine rubber powder comprising the steps of, soaking coarsely ground particles of vulcanized rubber with a reagent that is absorbed by the rubber but which does not change the chemical composition of the rubber particles, such that the rubber particles become impregnated with said reagent and swell, grinding said swollen rubber particles at least once to form superfine rubber particles, adding a crystalloid salt to the coarsely ground rubber particles prior to the final step of grinding.

43. The method of claim 42 wherein said crystalloid salt is zinc carbonate.

44. The method of claim 42 wherein the amount of said crystalloid salt which is added is about five percent or less.

* * * * *